United States Patent
Chinn et al.

(10) Patent No.: US 7,797,238 B2
(45) Date of Patent: Sep. 14, 2010

(54) BALANCE REWARDS ACCOUNT SYSTEM AND METHOD

(75) Inventors: Chandler Raymond Chinn, Charlotte, NC (US); Thomas Patrick Duffy, Charlotte, NC (US); Steven M. Grill, Charlotte, NC (US); Dean Kluesner, Charlotte, NC (US); Steven M. Kurk, Fort Mill, SC (US); John Michael Rees, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 11/565,156

(22) Filed: Nov. 30, 2006

(65) Prior Publication Data

US 2008/0133341 A1    Jun. 5, 2008

(51) Int. Cl.
*G06Q 40/00*    (2006.01)
(52) U.S. Cl. .......................................... 705/42; 705/14
(58) Field of Classification Search .................... 705/16, 705/26, 30, 35, 39, 40, 42, 50, 64, 70; 902/4, 902/10, 24; 186/32
See application file for complete search history.

(56) References Cited

U.S. PATENT DOCUMENTS

| 2002/0194099 | A1* | 12/2002 | Weiss ........................... 705/36 |
| 2006/0020530 | A1* | 1/2006 | Hsu et al. ...................... 705/35 |
| 2006/0200411 | A1 | 9/2006 | Morgenstern et al. |
| 2006/0259390 | A1* | 11/2006 | Rosenberger ................ 705/35 |

| 2008/0133341 | A1* | 6/2008 | Chinn et al. ................... 705/14 |

OTHER PUBLICATIONS

Deshmukh, Sudhakar et al. Capital Accumulation and Deposit Pricing in Mutual Financial Institutions. The Journal of Financial and Quantitative Analysis, Vol. 17, Issue 5. Dec. 1, 1982. pp. 705-725.*
Sargent, Thomas et al. The Stability of Models of Money and Growth with Perfect Foresight. Econometrica, vol. 41, No. 6 Nov. 1973. pp. 1043-1048.*
Tobin, James. Deposit Interest Celilings as a Monetary Control. Journal of Money, Credit & Banking, vol. 2, Issue 1. Feb. 1970. pp. 4-14.*
International Search Report, dated Oct. 1, 2008, Ref. International Application No. PCT/US 07/84947.
IPRP from Application No. PCT/US2007/084947, dated Jun. 11, 2009.

* cited by examiner

*Primary Examiner*—Hani Kazimi
*Assistant Examiner*—Muriel Tinkler
(74) *Attorney, Agent, or Firm*—Banner & Witcoff, Ltd.; Michael Springs

(57) ABSTRACT

A method for operating an account includes several steps. The account is provided for holding assets of a customer, the account having a variable value controlled by the customer. At least a portion of the assets are held in the account for a time period that includes a plurality of cycles. At least a portion of the assets are invested during the time period, and earnings on the investment are transmitted to the customer. A plurality of average cycle values of the account are calculated, with each average cycle value calculated over one of the plurality of cycles. A minimum average cycle value is selected from the plurality of average cycle values, and a bonus is calculated based on the minimum average cycle value. The bonus is transmitted to the customer, and the customer chooses whether to repeat the process.

19 Claims, 4 Drawing Sheets

BALANCE REWARDS ACCOUNT SYSTEM AND METHOD

TECHNICAL FIELD

The invention relates generally to a system and method for operating an account, and more specifically, to an account system and method that pays a bonus to a customer based on a representative value of assets in the account.

BACKGROUND OF THE INVENTION

Financial institutions in the current financial market provide many products and services to customers for storing and investing assets. Typically, each of these products and services has certain advantages and drawbacks. For example, a money market account provides high liquidity, which is advantageous in allowing customers quick access to their money, along with low risk, but typically has a low rate of return. In contrast, a certificate of deposit (CD) provides a higher rate of return, along with low risk, but has the drawback of low liquidity. Thus, customers often face the difficult decision of choosing whether to invest money in a lower-liquidity, higher-return account or a higher-liquidity, lower-return account. Customers can also choose to divide their funds between two such accounts, which has the drawback of complication. Additionally, high-liquidity accounts, such as money market accounts, contain little incentive for a customer to keep the balance of the account at a high level, which reduces the resources available to the financial institution for investing. Thus, a financial account product which provides high liquidity with a higher rate of return, and includes an incentive for customers to keep a high balance in the account, benefits both customers and financial institutions.

The present system and method are provided to solve the problems discussed above and other problems, and to provide advantages and aspects not provided by prior account systems and methods of this type. A full discussion of the features and advantages of the disclosed system and method is deferred to the following detailed description, which proceeds with reference to the accompanying drawings.

SUMMARY OF THE INVENTION

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

One aspect of the disclosure provides a method for operating an account that includes several steps. The account is provided for holding assets of a customer, the account having a variable value controlled by the customer. The assets are held in the account for a time period. A representative value of the account over a portion of the time period is calculated, and a bonus is calculated based on the representative value. The bonus is transmitted to the customer, and the customer chooses whether to repeat the process.

According to another aspect of the disclosure, the time period includes a plurality of cycles, and the representative value is the minimum average cycle value. The minimum average cycle value is calculated by calculating a plurality of average cycle values of the account, each average cycle value calculated over one of the plurality of cycles, and then selecting the minimum average cycle value from the plurality of average cycle values. In a further aspect, each cycle includes a plurality of sub-cycles, and a plurality of sub-cycle values of the account are each calculated over one of the plurality of sub-cycles. The average cycle value is calculated as an average of the plurality of sub-cycle values.

According to another aspect, the assets are monetary assets, and the value of the account is a monetary balance. In a further aspect, the bonus is a monetary bonus and is calculated as a percentage of the representative balance.

According to another aspect, the assets are invested during the time period, and earnings on the investment are transmitted to the customer. In a further aspect, the account is a money market account, and the assets in the account are invested in a money market during the time period.

Another aspect of the disclosure provides an account system that includes a memory for storing information. The information includes an account for holding monetary assets of a customer for a time period having a number of cycles. The account has a variable balance controlled by the customer. The system also includes means for calculating an average cycle balance for each of the number of cycles, means for selecting a minimum average cycle balance from the average cycle balances, means for calculating a monetary bonus based on the minimum average cycle balance, and means for transmitting the bonus to the customer. Each average cycle balance is stored in the memory, along with the minimum average cycle balance and the amount of the monetary bonus.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
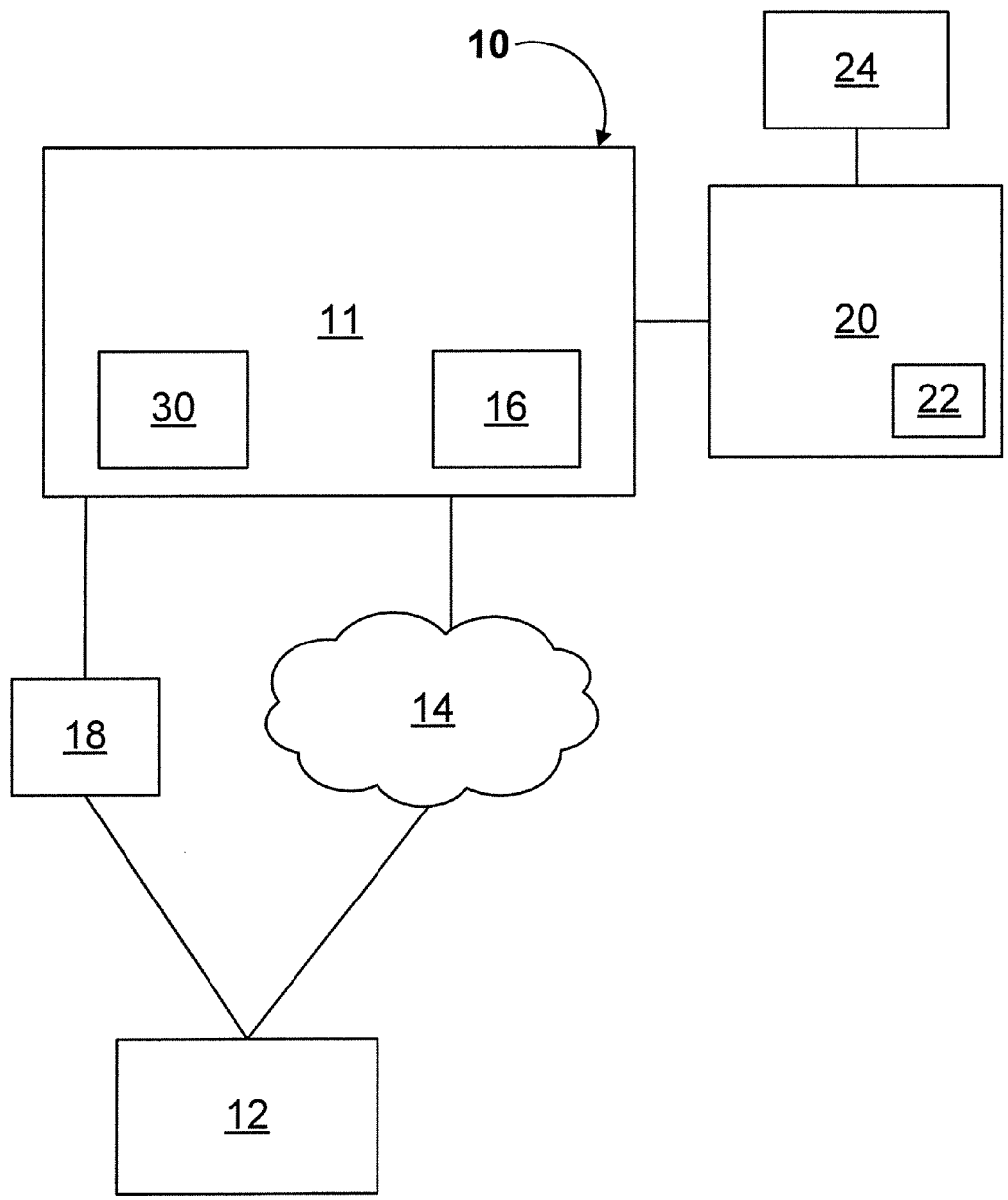
FIG. 1 is a schematic view of one embodiment of a system for operating an account.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 illustrates an exemplary system 10 that is capable of utilizing the disclosed method. The disclosed system and method can be used by or in connection with a bank or other financial institution 11, for example an investment firm or other business, or a government institution. These financial institutions 11 may include one or many brick-and-mortar operations 18 that service and interact with customers 12, such as a bank branch, and may also service and interact with customers 12 remotely via a network 14, such as by telephone, internet, and/or wireless communications. It is understood that a given institution 11 may service and interact with customers 12 using any one or a combination of these operations. Either method of interaction may include the use of institutional employees 30. Typically, such financial institutions 11 hold money or other assets of a customer 12 in an account 16 for use for various purposes.

Generally, an account 16 is any means for temporarily or permanently holding money or other assets and typically has a value reflecting a quantification of the assets currently held in the account 16. In the case of a money market account 16, or other account 16 holding monetary assets, the value is referred to as a "balance." The account 16 may have a variable value, which is controllable to some degree by the customer 12, or a fixed value, which remains the same for the life of the account 16. The assets held in the account 16 are commonly invested by the institution 11 in one or more of a nearly endless variety of ways. In one embodiment, the account 16 is a money market account and the assets are invested in a money market. In other embodiments, the assets may be invested in stocks and other securities, options, bonds, real estate, precious metals, futures, currency, or any other investment vehicle, or a combination of such vehicles. Some examples of accounts 16 which may be incorporated into the disclosed system and method include, without limitation: checking accounts, savings accounts, certificates of deposit, 401(k) accounts, individual retirement accounts (IRA's), mutual funds, brokerage accounts, qualified and non-qualified retirement accounts including simplified employee plans (SEP's), 529 plans, 403(b) plans, fixed and variable annuities, real estate investment trusts (REIT's), hedge funds, SAR accounts, 457 accounts, Keogh accounts, Coverdell Education Savings Accounts, Health Savings Accounts (HSAs), flexible spending accounts, exchange traded funds (EFTs), separate accounts, managed accounts, guaranteed investment contracts (GICs), options, puts, calls, derivatives, bonds, stocks, convertible securities, investment contracts, stored value cards, credit cards, universal life insurance, whole life insurance, term life insurance, bank-owned life insurance (BOLI), corporate-owned life insurance (COLI), hedge funds including 3(c)(7) and 3(c)(1) funds, private equity pools, common trust funds, collective trust funds, pension plans, IOLTA accounts, offshore accounts, and Undertakings for Collective Investments in Transferable Securities (UCITS) funds.

Additionally, the account 16 has a degree of liquidity, which is reflective of the ease and speed with which the customer 12 can access and/or control the assets in the account 16. In accounts 16 with a high degree of liquidity, customers 12 can withdraw money quickly and without a penalty, sometimes instantaneously on demand. Accounts 16 such as checking accounts, savings accounts, and money market accounts typically have a high degree of liquidity. In accounts 16 with a low degree of liquidity, customers 12 often cannot withdraw money quickly or on demand, or sometimes can do so only by incurring a penalty. Accounts 16 such as certificates of deposit, 401(k) accounts, individual retirement accounts, and permanent life insurance accounts typically have a low degree of liquidity. Other accounts have an intermediate degree of liquidity.

In one embodiment, the disclosed system and method incorporate a memory 20 for storing information for later access. Any type of information used in the system and method can be stored in the memory 20, including the account balance or value and other types of information identified herein. In the embodiment shown in FIG. 1, the memory 20 contains a database 22 for storing such information in an organized and easily accessible manner. In the embodiment shown in FIG. 1, the memory 20 is also connected to one or more processors 24 for processing the information in various ways, including making calculations using the information, and for performing other functions.

Figure 4:
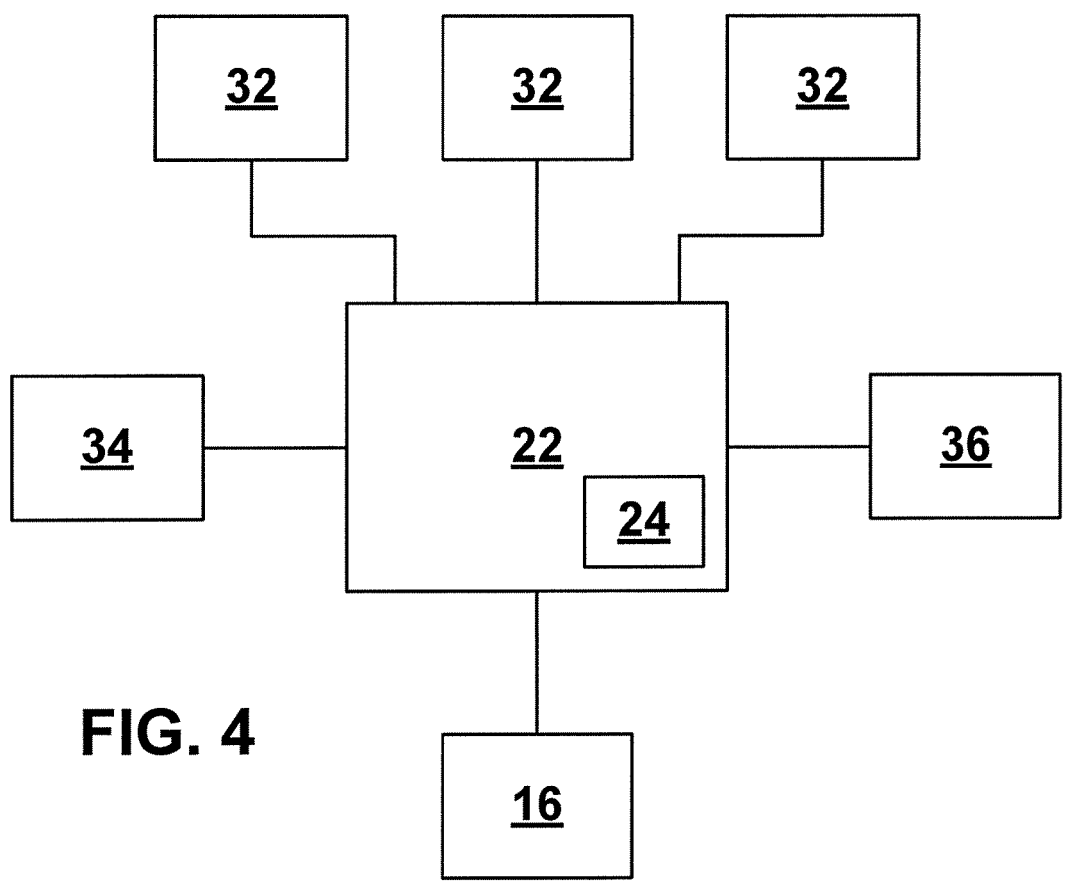
FIG. 4 is a schematic view of one embodiment of an account database for use in a financial institution.

The system and method may be operated in connection with a comprehensive account database 22 connected to the account 16, as illustrated in FIG. 4. The account database 22 contains the processor 24 and performs operations on the data stored within, as well as storing the data. In one embodiment, the financial institution 11 has several platforms 32, for example, bank divisions each covering a designated geographical area, and the account database 22 is central and is connected all of the platforms 32. Each platform 32 may contain its own computer system for keeping of account records. Accordingly, the account database 22 provides for centralized processing and information storage for all the accounts 16 in the system 10, on all platforms 32 and across the entire financial institution 11. Advantageously, the account database 22 is capable of performing calculations for account systems having goal-based savings and/or event-based bonus structures, such as the account system 10 described herein. Additionally, in one embodiment the account database 22 is configured to process and store information from other accounts in other account systems. This permits the financial institution 11 to create several different event-based bonus systems and utilize the account database 22 to calculate bonuses for all of the account systems. In other embodiments, the account database may be dedicated solely to the account system 10 described herein. Further, the account database 22 provides a translation function for translating the information stored therein into one of a variety of forms. This allows the database 22 to transmit data to different applications in whatever form is required by each particular application, providing an advantage over previous database systems, where it was necessary for each application to retrieve data from the database and then translate the data into the proper form for that application.

In one embodiment, the account database 22 is capable of performing many actions of the system and method, including storing information, calculating balances, selecting the representative balance, and calculating the bonus. When used with the embodiment of the method illustrated in FIGS. 2-3, this account database 22 is capable of performing such actions as calculating the average monthly balances of the account, storing the average monthly balances, selecting the minimum average monthly balance, storing the minimum average monthly balance, and calculating the monetary bonus. Accordingly, the account database 22 can constitute means for accomplishing each of these actions.

In the embodiment shown in FIG. 4, the account database 22 stores account information, such as sub-cycle values, average cycle values, and minimum average cycle values. Some of this stored information may be received from outside sources, such as from a branch bank or a computer system within a platform 32, and other stored information may be produced by the account database 22 itself, such as by performing operations on the data already stored within. The account database 22, using the processor 24, also performs operations on the stored data, such as balance history calculations, including calculating average cycle values or minimum average cycle balances. Further, the data in the account database 22 is organized and correlated so that selective operations can be performed on the data. For example, the institution may choose to change the bonus structure for accounts meeting certain selected criteria, and the account database 22 is capable of storing and performing such instructions. The centralized nature of the account database 22 permits the bonus structure for a single account 16, or multiple accounts 16, to be changed simply by changing the bonus factor stored in the account database 22.

In one embodiment, the ultimate input of the account database 22 is generally account information, such as transaction data and balance history, and the ultimate output of the account database 22 is generally the bonus. Accordingly, in this embodiment, other operations and calculations performed by the account database 22 are generally precursors to the production of the bonus amount. It is understood that the account database 22 may be configured to receive other inputs, and to produce other outputs as well, including, for example, reporting information about expected bonuses to an accounting system 36 for budgeting purposes. The account database 22 can also output data to other mainframes, databases, etc., either automatically or upon request, to notify such other entities about changes in the account or actions performed by the database 22. The translation function described above facilitates this action. Such outputs as monthly statements and proactive customer information, as described below, may also be produced by the account database 22 in some embodiments. Additionally, the database 22 is accessible so that an operator can view and search records stored in the database 22.

The account database 22 may also be connected to an archival database 34 for storage of historical information. At some point after the original time period has expired and the bonus has been paid, the account database 22 may transfer some or all of the stored account information to the archival database 34 for long-term storage, creating space for active account information.

Figure 2:
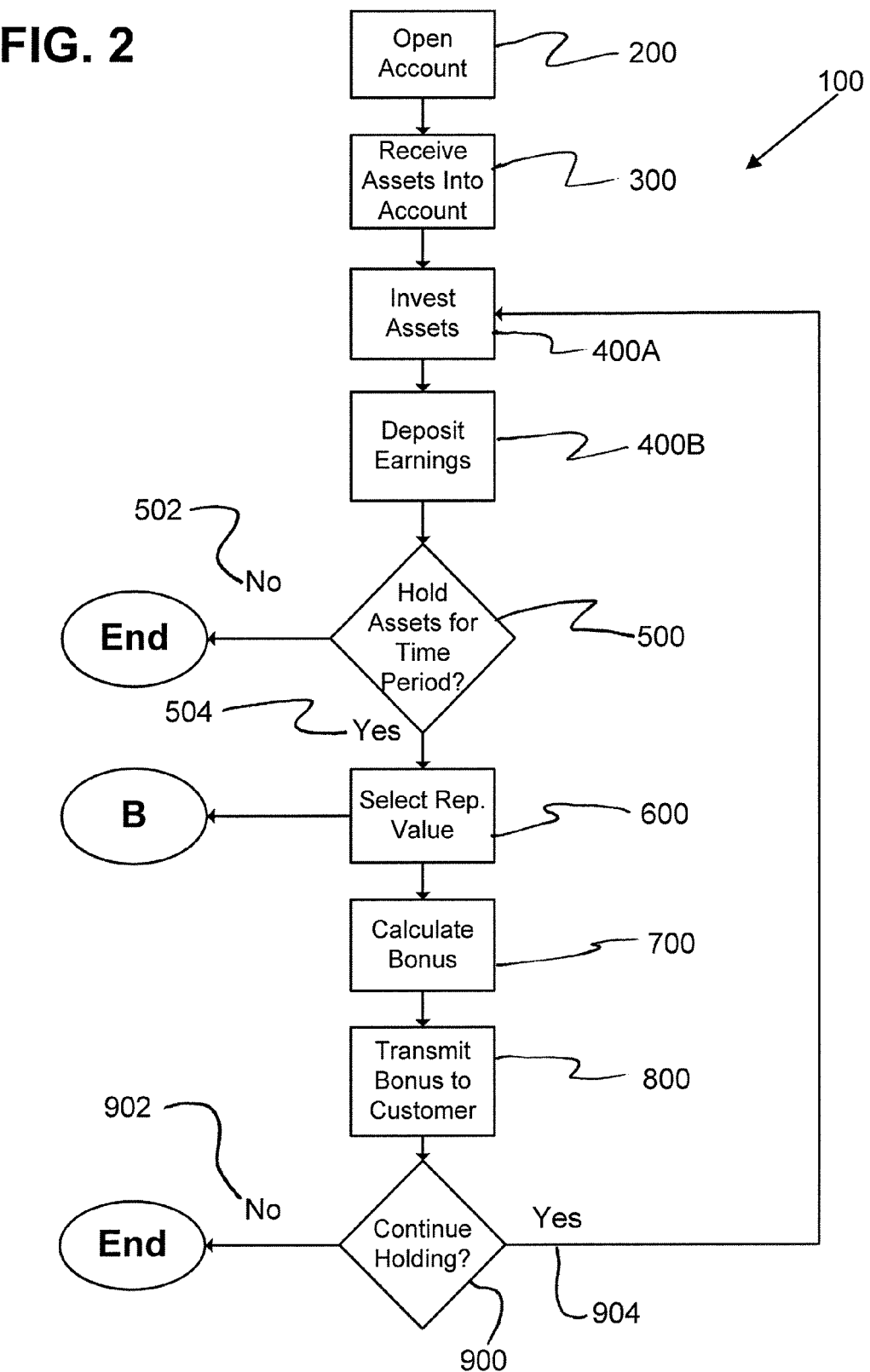
FIG. 2 is a flowchart depicting one embodiment of a method of operating an account.

FIG. 2 illustrates one embodiment of practicing the method 100 of operating the account 16. Two of the preliminary steps in the disclosed method are opening the account 16, at step 200, and receiving assets of a customer 12 into the account 16, at step 300, to create the initial account value. Often, these two steps are performed simultaneously, as assets are deposited into the account 16 when the account 16 is opened, or shortly thereafter. It is understood that, depending on the type of account 16 in question, the customer 12 may be able to optionally deposit additional assets into the account 16 or withdraw assets from the account 16 at a later time, and the flowchart in FIG. 2 reflects only the required initial deposit.

The account value may also be affected by interest or other earnings on the assets, if any, which are applied to the account 16 or otherwise transmitted to the customer 12. In the embodiment illustrated, at least a portion of the assets are invested, at step 400A. As described above, in one embodiment, the assets are invested in a money market. At step 400B, earnings on the investment are deposited into the account 16 or otherwise transmitted to the customer 12. These earnings may be reflective of the performance of investments made on the assets, and thus, it is understood that in some circumstances, the earnings on the account 16 may be negative or zero. Money market accounts generally have a variable interest rate related to the performance of the investments, but never produce negative earnings for the customer. In other embodiments, the earnings are deposited at a set interest rate, regardless of the performance of the investments. Earnings are calculated by methods known to those skilled in the art. In further embodiments, the assets need not be invested. Assets received into the account 16 are generally held in the account 16 until the customer 12 withdraws the assets or the account 16 closes, subject to other potential value-affecting occurrences, such as loss due to risky investment and penalty payments or other account charges.

In utilizing the present method, a time period is defined by the institution 11, and the customer 12 is eligible to receive a bonus on assets held in the account 16 over the time period. Accordingly, at step 500, the customer 12 chooses whether to hold at least a portion of the assets in the account 16 over the time period. If the customer 12 chooses to remove the assets from the account 16 prior to the completion of the time period, at 502, the process ends. If the customer 12 chooses to hold assets in the account 16 over the entire time period, at 504, the process proceeds to step 600. In one embodiment, described below, the assets are held in the account 16 for much longer than the defined time period, and the customer 12 is eligible to receive the bonus on every anniversary of the time period. Accordingly, if the time period is one year, the customer 12 is eligible to receive the bonus once a year, and if the time period is three months, the customer 12 is eligible to receive the bonus every three months.

Figure 3:
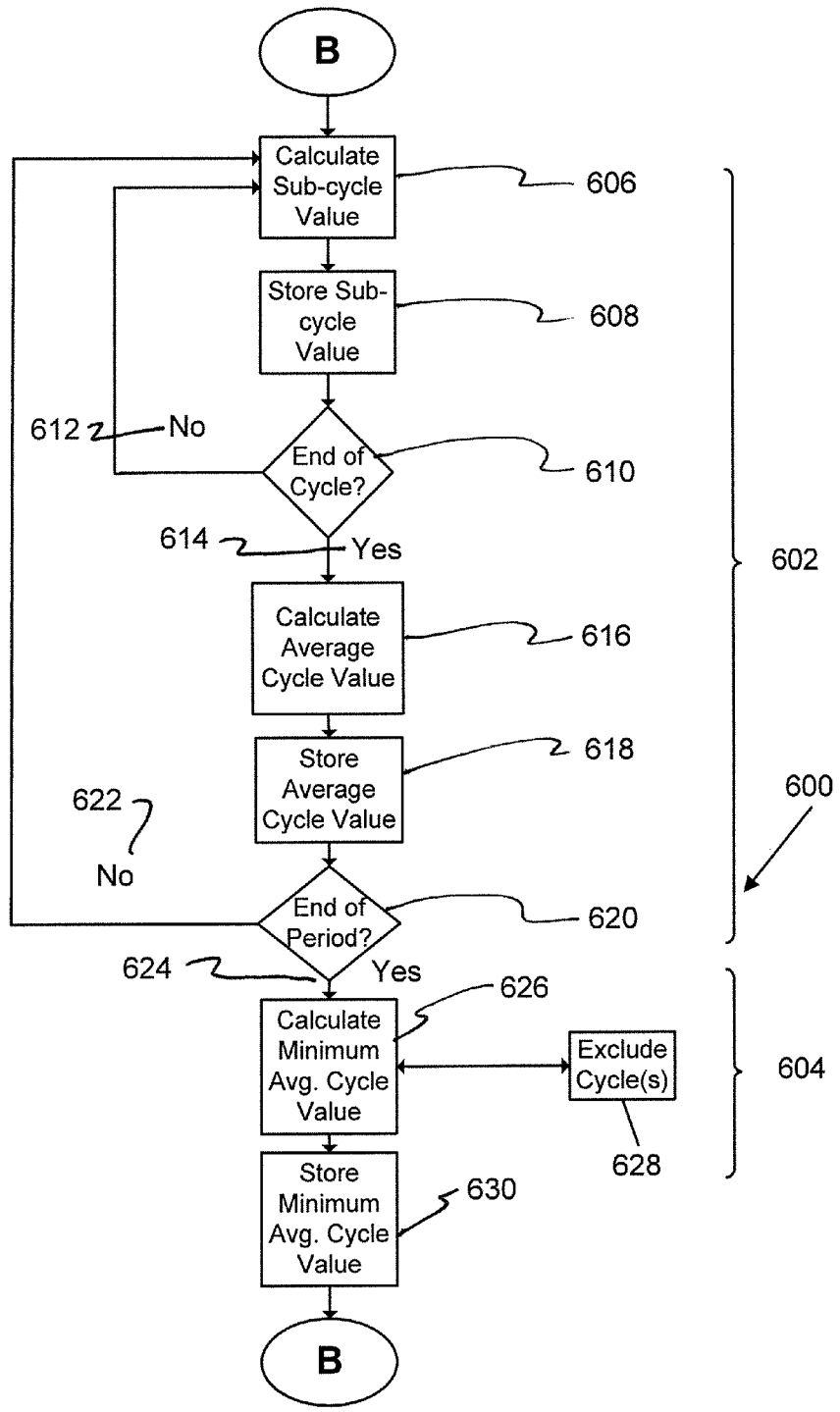
FIG. 3 is a flowchart depicting one embodiment of a method for selecting a representative value, as a step in the method of FIG. 2.

In the embodiment illustrated in FIGS. 2-3, the time period is divided into a plurality of cycles, which are typically all of substantially equal length. In one embodiment, the time period is one year and the cycles are each one-month cycles, with each cycle beginning within two business days of a fifteenth day of each month. These one-month cycles may alternately be calendar-month cycles or another arrangement, and the institution is free to define any beginning and end point for a cycle. Other embodiments may have a different cycle length, and the institution 11 is free to define any time period and cycle length it deems suitable. For example, two-week cycles may be used by some institutions 11. The institution 11 may also choose to divide each of the cycles into a plurality of sub-cycles. In the embodiment discussed above, each one-month cycle is divided into one-day sub-cycles. Because different months have different numbers of days, all cycles may not necessarily have the same number of sub-cycles in this embodiment. As with the cycles, the institution 11 is free to define any length and division of sub-cycles it deems suitable. Alternately, the institution 11 may choose not to break down the time period into cycles or not to break down the cycles into sub-cycles, or the institution 11 may choose to further break down the sub-cycles into smaller temporal periods.

In some embodiments, an average value for the account 16 may be calculated over one or more of the above-described temporal divisions. For example, an average period value is defined as the average value of the account 16 over the defined time period. Likewise, an average cycle value is defined as the average value of the account 16 over one of the defined cycles, and an average sub-cycle value is defined as the average value of the account 16 over one of the defined sub-cycles. These average values can be calculated in different ways, and calculation is described in more detail below.

In general, the system and method involve calculating the bonus to the customer 12 based on a representative value or balance of the account 16. Selection of the representative value, at step 600, can be done using criteria determined by the institution 11 and/or agreed upon by the customer 12. In one embodiment, the representative value is an average value of the account 16 over at least a portion of the time period. Such an average value could be the average value of the account 16 over the entire time period, or the average value of the account 16 over a portion of the time period, such as an average value of the account 16 over a single cycle. In further embodiments, the representative value could be an average of a plurality of average values, such as an average of all the average cycle values or an average of all the average sub-cycle values. Thus, in such embodiments, selection of the representative value, at step 600, includes both calculation of one or more average values and selection of the average value to be used for bonus calculation. For example, in one embodiment, the representative value is the minimum average cycle value, i.e., the average value of the account 16 for the cycle having the lowest average cycle value. Thus, in this embodiment, the representative value is selected, at step 600, by calculating the average cycle values for the cycles in the time period and selecting the lowest of the average cycle values. Calculation of the average cycle values and selection of the minimum average cycle value are described in more detail below and illustrated in FIG. 3. The bonus is calculated, at step 700, based on the representative value, using factors determined by the institution 11 and/or agreed upon by the customer 12. Calculation of the bonus is also described in more detail below. In still further embodiments, the representative value may not be an average value, and may be selected using different criteria, such as using a minimum or maximum value of the account over a time period, a median value of the account over a time period, an end balance of the account at the expiration of a time period, a specified percentile-value of the account over a time period, or a randomly-selected balance of the account. Calculation of such representative values may be accomplished in a variety of manners, including any manner known in the art.

FIG. 3 illustrates one method 600 for selecting the representative balance, including one method 602 for calculating the average cycle values, and one method 604 for selecting the minimum average cycle value. At step 606, a sub-cycle value is calculated for a sub-cycle within a given cycle. In one embodiment where the account 16 holds monetary assets, each sub-cycle is one day, and the sub-cycle balance is the average daily balance in the account 16. In this embodiment, the "collected balance" is used to determine the daily balance of the account 16. The collected balance reflects the balance of money that is actually in the account 16, after transactions (e.g. checks, ACH transfers, debit card purchases, ATM deposits or withdrawals) have cleared. In other embodiments, the method may use the "ledger balance," which tracks money as soon as a transaction is recorded, regardless of whether the transaction has cleared. In further embodiments, the sub-cycle value may be an instantaneously-measured sub-cycle value, such as a daily balance of the account at the close of business on each day, or the minimum or maximum value of the account on that day. At step 608, the sub-cycle value is stored in the memory 20, and in one embodiment, is stored in the database 22. At step 610, it is determined whether the end of the cycle has been reached. If no 612, then the process returns to step 606 to calculate the sub-cycle value for the subsequent sub-cycle. This process repeats until the end of the cycle is reached 614, advancing the process to step 616.

At step 616, the average cycle value is calculated as an average of the sub-cycle values within the cycle. In one embodiment, each cycle is one month, and each sub-cycle is one day, and the average monthly value is selected as an average of the daily values. At step 618, the average cycle value is stored in the memory 20, and in one embodiment, is stored in the database 22. At step 620, it is determined whether the end of the time period has been reached. If no 622, then the process returns to step 606 to calculate the sub-cycle value for the first sub-cycle of the subsequent cycle. This process repeats until the end of the time period is reached 624, advancing the process to the method 604 for selecting the minimum average cycle balance.

At step 626, the minimum average cycle balance is selected from the average cycle values stored in the memory 20, as the lowest of the average cycle values. Optionally, one or more average cycle values may be excluded from selection of the minimum average cycle value, based on certain criteria, at step 628. In one embodiment, the average cycle value of a temporally-first cycle of the time period is excluded, and in another embodiment, the average cycle values of temporally-first and temporally-second cycles of the time period are excluded. This exclusion remedies a perception of unfairness on the part of a customer 12 who opens the account 16 with a low initial deposit but builds the value up quickly. Other criteria may be used for exclusion as desired. At step 630, the selected minimum average cycle value is stored in the memory 20. After step 630, step 600 has been completed, and the process proceeds to step 700.

Returning to FIG. 2, at step 700, the bonus is calculated based on the representative value, and using a specified factor or factors. In one embodiment, the bonus is a monetary bonus and is calculated as a percentage of the representative value, and the representative value is the minimum average cycle value. This percentage is pre-determined at or around the opening of the account 16 and agreed to by the customer 12 and the institution 11. Further, this percentage is calculated to ensure that the bonus paid on the representative value makes the customer's 12 profit on the account 16 more similar to the earnings the customer 12 would have earned if the representative balance were placed in a higher-yield, lower liquidity account 16. In other embodiments, the factor or factors may not be pre-determined, and may be different. For example, the factor may vary based on the representative value or the type or nature of the transactions conducted by the customer. In further examples, the factor may be a stepped-rate threshold (e.g., one dollar for every 100 dollars in the account), a variable point or dollar factor, or merchandise.

In the embodiment shown, a factor for calculating the bonus is determined prior to step 700, which in this example, is a percentage of the minimum average cycle value. This determination may be performed at nearly any point in the process in some embodiments, including at the opening of the account 200, as with the above-described embodiment. In one embodiment, the customer 12 may optionally elect to change the factor if circumstances have changed, such as the institution 11 offering a higher bonus percentage. This option remedies a perception of unfairness by a customer 12 who opens the account 16, only to see the offered bonus rate jump shortly thereafter. If the customer 12 elects to change the factor, the time period is reset, the process returns to step 400A, and the customer 12 forfeits any bonus for the period before the change. In other embodiments, the aspects of the customer option may be altered, including potentially continuing with the original time period and either applying the new bonus factor over the time period, paying a prorated bonus on the previous time period, or calculating a "hybrid" bonus factor based on the old and new rates. In another example, the customer 12 may be offered an opportunity to raise the bonus factor, with the understanding that the time period for collecting the bonus will increase as well. In performing step 700, the factor is applied to the representative value to calculate the amount of the bonus. The process then proceeds to step 800.

At step 800, the bonus is transmitted to the customer 12. In one embodiment, the bonus is transmitted by depositing the bonus directly into the account 16. In other embodiments, the bonus may be transmitted in a different way, such as by sending directly to the customer 12. The system and method may provide for the customer 12 to select or request the form of the bonus (e.g., merchandise, money, points, etc.) and the method of transmitting the bonus and/or earnings. Transmitting earnings, at step 400B, can be accomplished in the same manner as transmitting the bonus.

After the expiration of the time period, the customer 12 chooses, at step 900, whether to continue holding assets in the account 16 after the expiration of the time period. If the customer 12 chooses to remove the assets, at step 902, the process ends. If the customer 12 chooses to hold the assets in the account 16 for additional time, at step 904, the process returns to step 400A, and substantially repeats itself for the second time period. It is understood that when the repeated process reaches step 500, the customer 12 is choosing whether to hold assets in the account 16 for a second time period. Additionally, the bonus factor or rate can be reset at the beginning of a second or any subsequent time period.

One exemplary embodiment of the system and method includes several other features, including means for receiving and responding to customer 12 requests regarding the account 16, means for generating periodic statements, and means for proactively communicating account information to the customer 12.

The means for receiving and/or responding to customer requests regarding the account 16 can be embodied in a number of different structures or entities. The institution 11 can have employees 30, such as customer service representatives, to receive requests via any suitable communication, such as telephone, email, or in person, and to respond accordingly. The processor 24 can receive information regarding a customer request and, depending on the nature of the request, either automatically generate a response or notify a customer service employee 30 of the request. Such customer requests can be in regard to such topics as the account balance, the expected bonus, or effect of withdrawals on the expected bonus. Accordingly, the system 10 is able to perform account analytics, such as making calculations similar to those of steps 600 and 700 at any time prior to the end of the time period, for the purpose of answering customer requests or providing detailed information and predictions.

The means for generating periodic statements regarding the account 16 can also be embodied in a number of different structures or entities. Institutional employees 30 can generate periodic statements, or the processor 24 can automatically generate monthly statements. Additionally, the employees 30 and the processor 24 can cooperate to generate periodic statements. Periodic statements can be issued with regularity in pre-set intervals, and are often issued once every cycle, such as is common in the case of accounts 16 having a one-month cycle length. These statements typically include account value or balance information, as well as account activity within the applicable period of time. The statements may also include other information, including information regarding the potential bonus amount, the bonus factor, etc.

Proactive account information is generally distributed at the volition of the institution 11, to serve various purposes such as customer information and satisfaction, advertising, or promotion. For example, this information can include material notifying the customer 12 of the current minimum cycle value and the corresponding bonus to expect if the assets are kept in the account 16 for the entirety of the time period. Accordingly, as stated above, the system 10 may make preliminary calculations similar to those of steps 600 and 700 in creating this information. As another example, the information can include advertisements of increased bonus rates to current account customers 12, or advertising of the account system to prospective customers. As an additional example, the information can include tax reporting information for the customer.

As stated above, FIGS. 2-3 illustrate an exemplary embodiment of practicing the method of operating the account 16. The system 10 illustrated in FIG. 1 is suitable for carrying out the steps of the disclosed method. The steps of the method described above can be accomplished by means contained within the financial institution 11, such as the institutional employees 30 or the memory 20, database 22, and processor 24, or a combination of employees 30 and computer components 20,22,24. Other components of the system 10 and the financial institution 11 can also constitute means for accomplishing the steps of the method. It is understood that the financial institution 11 itself may not perform one or more steps of the disclosed method, and that the institution 11 may provide for performing one or more of the steps, such that the one or more steps may be performed by the institution 11 or another entity.

The system and method are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The system and method may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in the memory 20, which can include both local and remote computer storage media including memory storage devices. It is understood that connections and communications disclosed herein may be made by any type of wired or wireless connection or communication.

The disclosed system and method provide many benefits not provided by prior accounts and investment services. When used with a high-liquidity account such as a money market account, the added bonus provides an account with high liquidity and a high rate of return, benefiting the customers and increasing demand for the product. In particular, the system and method can provide the liquidity of a money market account with a higher return more similar to a certificate of deposit, without the drawback of low liquidity. The periodic nature of the bonus structure also provides an incentive for customers to keep a high balance in the account, which benefits the financial institution operating the account. Other features, such as the option to change the bonus rate, or the step of excluding the first two cycles from the minimum balance calculation, further increase marketability and demand for the product. Still other benefits and advantages exist and are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be embodied in other specific forms without departing from the spirit or central characteristics thereof. The present examples and embodiments, therefore, are to be considered in all respects as illustrative and not restrictive, and the invention is not to be limited to the details given herein. The term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A computer-implemented method for operating a money market account, comprising:
   storing an account balance in an account memory, the account balance indicating monetary assets of a customer contained in the account and being variable at the control of the customer, wherein at least a portion of the monetary assets are invested in a money market over a time period comprising a plurality of discrete temporal divisions wherein the money market has a predetermined interest rate;
   calculating, using a processor in communication with the account memory, a plurality of average balances of the account, each average balance calculated over one of the discrete temporal divisions of the time period;
   selecting one of the average balances, based on predetermined criteria, to represent a selected average balance of the account, wherein the predetermined criteria excludes the first one or two temporal divisions; and
   calculating, using the processor, a monetary bonus that is calculated based on a predetermined percentage of the selected average balance;
   wherein a statement is transmitted to the customer indicating the bonus.

2. The method of claim 1, wherein the time period comprises a plurality of cycles, and the selected average balance is calculated over at least one of the cycles.

3. A computer-implemented method for operating an account, comprising:
   storing an account value in an account memory, the account value indicating assets of a customer contained in the account and being variable at the control of the customer, wherein at least a portion of the assets are contained in the account for a time period, the time period comprising a plurality of cycles wherein the account has a predetermined interest rate;
   calculating, using a processor in communication with the account memory, a plurality of average cycle values of the account, each average cycle value calculated over one of the plurality of cycles;
   selecting a minimum average cycle value from the plurality of average cycle values, wherein selecting the minimum average cycle value excludes the first one or two cycles; and
   calculating, using the processor, a monetary bonus that is calculated based on a predetermined percentage of the minimum average cycle value;
   wherein a statement is transmitted to the customer indicating the bonus.

4. The method of claim 3, wherein the time period is one year and each cycle is one month, and each cycle begins within two business days of a fifteenth day of each month.

5. The method of claim 3, further comprising:
   storing the plurality of average cycle values in the memory; and
   storing the minimum average cycle value in the memory.

6. The method of claim 3, wherein each cycle comprises a plurality of sub-cycles, and calculating each of the average cycle values comprises:
   calculating a plurality of sub-cycle values of the account, each sub-cycle value calculated over one of the plurality of sub-cycles; and
   calculating the average cycle value as an average of the plurality of sub-cycle values.

7. The method of claim 3, wherein the average cycle value of a temporally-first cycle of the time period is excluded from selection of the minimum average cycle value.

8. The method of claim 3, further comprising:
   determining the predetermined percentage; and
   changing the predetermined percentage based on a request by the customer.

9. The method of claim 3, further comprising:
   holding at least a portion of the assets in the account for a second time period after conclusion of the first time period, the second time period comprising a second plurality of cycles;
   calculating a second plurality of average cycle values of the account for the second time period, each average cycle value calculated over one of the second plurality of cycles;
   selecting a second minimum average cycle value from the second plurality of average cycle values over the second time period;
   calculating a second bonus based on the second minimum average cycle value; and
   providing for transmitting the second bonus to the customer.

10. The method of claim 3, wherein the bonus is a monetary bonus and is transmitted to the customer by depositing the bonus in the account.

11. A computer-readable medium containing computer-executable instructions configured to cause a computer to perform:
   storing an account balance in an account memory, the account balance indicating monetary assets of a customer contained in an account and being variable at the control of the customer, wherein at least a portion of the monetary assets are invested in a money market over a time period, and wherein at least a portion of the monetary assets are contained in the account for a one-year time period including twelve months wherein the money market has a predetermined interest rate;
   calculating, using a processor in communication with the account memory, twelve average monthly balances of the account, each average monthly balance calculated over one month of the one-year time period, each month having a plurality of days, wherein calculating each of the average monthly balances comprises the steps of:
      calculating a plurality of daily balances of the account, each daily balance calculated for one of the plurality of days of the month;
      storing each of the daily balances in the memory; and
      calculating the average monthly balance as an average of the plurality of daily balances;
   storing each of the average monthly balances in the account memory;
   selecting a minimum average monthly balance from the twelve average monthly balances, wherein selecting the minimum average monthly balance excludes the first one or two months;
   storing the minimum average monthly balance in the account memory;

calculating, using the processor, at or after the end of the one-year time period, a monetary bonus based on a predetermined percentage of the minimum average monthly balance; and providing for transmitting a statement indicating the bonus to the customer, at or after the end of the one-year time period.

12. The computer-readable medium of claim 11, wherein the instructions are configured to be executed by a computer comprising a database in communication with a plurality of platforms of a financial institution, and the instructions are configured to cause the database to calculate the twelve average monthly balances of the account, store each of the average monthly balances, select the minimum average monthly balance from the twelve average monthly balances, store the minimum average monthly balance, and calculate the monetary bonus.

13. A money market account system comprising:
an account memory for storing account information, the account information comprising an account for holding monetary assets of a customer for a time period comprising a number of cycles, the account having a variable balance controlled by the customer wherein the account has a predetermined interest rate; and
a processor in communication with the account memory, the processor configured to perform:
calculating an average cycle balance for each of the number of cycles, wherein each average cycle balance is stored in the memory;
selecting a minimum average cycle balance from the average cycle balances, wherein selecting the minimum average cycle value excludes the first one or two cycles; and
calculating a monetary bonus based on a predetermined percentage of the minimum average cycle balance, wherein a statement indicating the bonus is transmitted to the customer.

14. The system of claim 13, wherein the time period is one year and each cycle is one month, and each cycle begins within two business days of a fifteenth day of each month.

15. The system of claim 13, wherein each cycle comprises a plurality of sub-cycles, and the system further comprises means for calculating a plurality of sub-cycle balances of the account, each sub-cycle balance calculated over one of the plurality of sub-cycles, wherein the average cycle balance is calculated as an average of the plurality of sub-cycle balances.

16. The system of claim 13, further comprising an account database connected to the account memory for storing the account information, the account database in communication with a plurality of platforms of a financial institution.

17. The system of claim 13, wherein the processor is further configured for receiving customer inquiries regarding the account.

18. The system of claim 13, wherein the processor is further configured for receiving additional account information indicating deposits of the customer assets into the account and withdrawals of the customer assets from the account to permit the customer to control the balance of the account.

19. The system of claim 13, wherein at least a portion of the assets is invested in a money market over the time period and a statement indicating earnings from investing the assets to the customer.

* * * * *